(12) United States Patent
Roschmann et al.

(10) Patent No.: US 8,460,445 B2
(45) Date of Patent: Jun. 11, 2013

(54) CORROSION PROTECTION COATINGS

(75) Inventors: Konrad Roschmann, Ludwigshafen-Edigheim (DE); Virginie Bette, Mannheim (DE); Stephan Amthor, Ludwigshafen (DE); Hermann Bergmann, Singapore (SG); Marc Schroeder, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/479,823

(22) Filed: May 24, 2012

(65) Prior Publication Data

US 2012/0227618 A1 Sep. 13, 2012

Related U.S. Application Data

(62) Division of application No. 12/602,599, filed as application No. PCT/EP2008/057096 on Jun. 6, 2008.

(30) Foreign Application Priority Data

Jun. 11, 2007 (EP) ..................... 71099568

(51) Int. Cl.
*C09K 3/00* (2006.01)
*C09K 15/00* (2006.01)
*C09K 15/28* (2006.01)
*C23F 11/00* (2006.01)
*B05D 3/02* (2006.01)
*C09D 5/08* (2006.01)

(52) U.S. Cl.
USPC .......... 106/14.42; 106/14.05; 106/14.15; 106/14.41; 106/14.43; 252/387; 252/391; 252/394; 252/395; 252/396; 427/384; 427/388.1; 524/81; 524/186; 524/210

(58) Field of Classification Search
USPC ....... 252/387, 391, 394, 395, 396; 106/14.05, 106/14.15, 14.41, 14.42, 14.43; 427/384, 427/388.1; 524/81, 186, 210
See application file for complete search history.

(56) References Cited

U.S. PATENT DOCUMENTS

| 4,086,274 | A | 4/1978 | Kaiser et al. |
| 4,299,974 | A | 11/1981 | Liu et al. |
| 5,707,941 | A | 1/1998 | Haberle |
| 6,852,369 | B1 * | 2/2005 | Atwood .................. 427/435 |
| 2008/0131687 | A1 * | 6/2008 | Fernandez Gonzalez et al. .................. 428/332 |

FOREIGN PATENT DOCUMENTS

| DE | 199 14 896 | 10/2000 |
| EP | 0 101 007 | 2/1984 |
| EP | 0 161 222 | 11/1985 |
| EP | 0 256 978 | 2/1988 |
| GB | 2 324 084 | 10/1998 |
| JP | 2003082287 | * 3/2003 |
| WO | 2011892 | 7/1979 |
| WO | 2004 059036 | 7/2004 |
| WO | 2004 101638 | 11/2004 |
| WO | 2005 005565 | 1/2005 |
| WO | WO 2006079627 A1 * | 8/2006 |

OTHER PUBLICATIONS

Tan et al. Effects of ring substituents on the protective properties of self-assembled benzenthiols on copper. Corrosion Science 48 (2006) 840-862.*

Zhang, J. et al., "Adsorption of Amide-Containing Alkanethiols on Gold", Ber. Bunsenges. Phys. Chem., vol. 102, No. 4, pp. 701-703, (1998).

Foye, et al., "Antiradiation Compounds I Acylated Derivatives of β-Mercaptoethylamine", Journal of Pharmaceutical Sciences, vol. 51, No. 2, pp. 168-171, Feb. 1962.

Endo, et al., "Specific Weak Interactions Related to Geometrical Shape of Associating Thiols", (1980), The chemical Society of Japan, Chemistry Letters, pp. 1291-1294.

* cited by examiner

*Primary Examiner* — Harold Pyon
*Assistant Examiner* — Tanisha Diggs
(74) *Attorney, Agent, or Firm* — Oblon, Spivak, McClelland, Maier & Neustadt, L.L.P.

(57) ABSTRACT

The present invention relates to new coating materials for corrosion control.

6 Claims, 1 Drawing Sheet

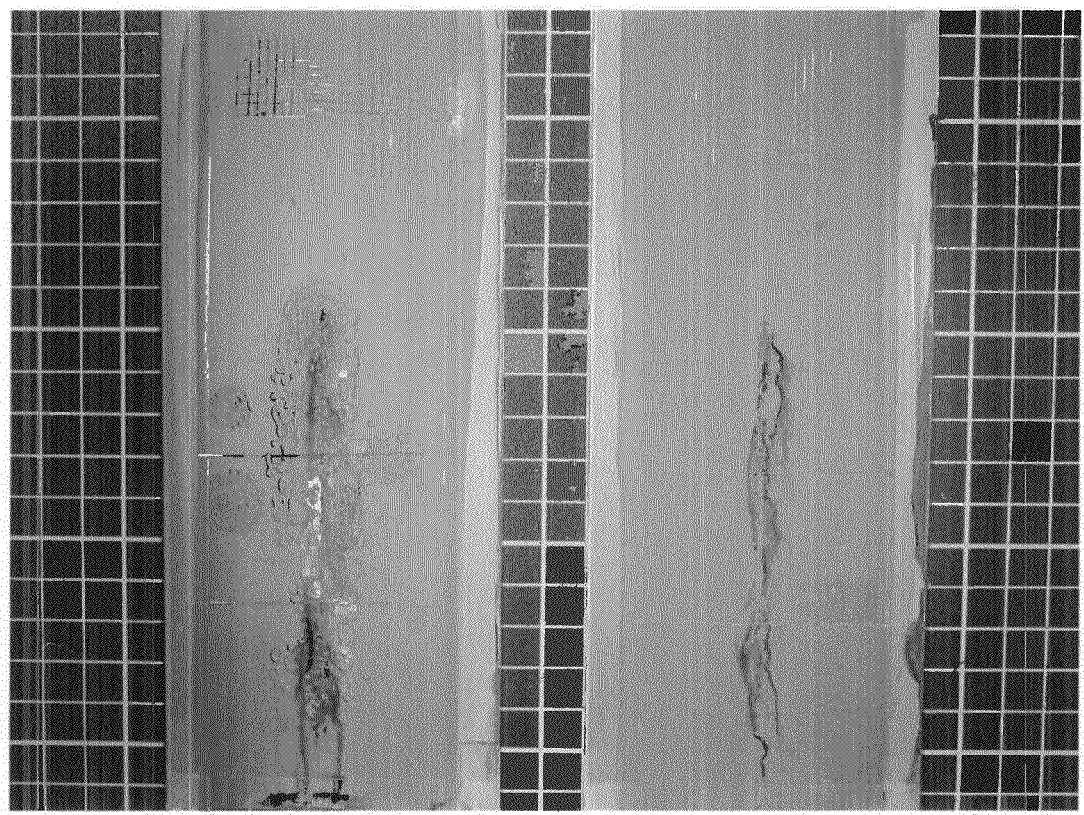

CORROSION PROTECTION COATINGS

CROSS-REFERENCE TO RELATED APPLICATIONS

This application is a divisional of U.S. Ser. No. 12/602,599 filed Dec. 1, 2009, abandoned, which was a National Stage of PCT/EP08/57096 filed Jun. 6, 2008 and claims the benefit of EP 07109956.8 filed Jun. 11, 2007.

The present invention relates to new coating materials for corrosion control.

WO 2004/059036 A2 describes compounds for the treatment of metal surfaces that comprise at least one group which is capable of producing interactions with metal surfaces, and which also have at least one hydrophobic group and at least one hydrophilic group. Thioether groups and disulfide groups are given only within extensive lists.

EP 161222 A2 and EP 256978 A1 disclose the use of benzothiazoles and of benzotriazoles comprising thio groups in corrosion control.

GB 2324084 A discloses the use of compounds which bear a mercapto group and an amino group in corrosion control. Compounds of this kind can be obtained, for example, by forming adducts of amidoamines and ethylene sulfide. In a reaction of this kind the amino group is the more reactive group, and so it is exclusively the amino group and not the amido group that reacts.

In spite of these and a multiplicity of other compounds which find application as corrosion inhibitors, there is a continual need for further corrosion inhibitors having improved activity or improved other properties.

It was an object of the present invention to provide further inhibitors for corrosion control.

BRIEF DESCRIPTION OF THE DRAWING

FIG. 1 shows pictures of metal panels subjected to a Salt spray test/evaluation where use Example 2 (comparative) is on the left; and use Example 1 (inventive) is on the right-hand side.

This object has been achieved through the use of compounds (D) of the formula (I)

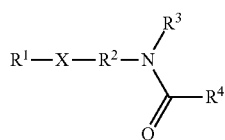

in corrosion control, in which
$R^1$, $R^3$ and $R^4$ may be selected independently of one another from the group consisting of $C_1$-$C_{18}$ alkyl, $C_6$-$C_{12}$ aryl, $C_5$-$C_{12}$ cycloalkyl, and five- to six-membered heterocycles which contain oxygen, nitrogen and/or sulfur atoms and may each optionally be substituted by aryl, alkyl, aryloxy, alkyloxy, heteroatoms and/or heterocycles,
$R^1$ and $R^3$ independently of one another may additionally be hydrogen, and
$R^2$ may be a divalent organic radical, and
X may be selected from the group consisting of —S—, —SO— and —SO$_2$—.

The group —S— identifies a sulfide group, the group —SO— a sulfoxide group

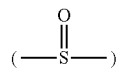

and the group —SO$_2$— a sulfone group

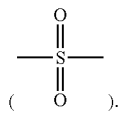

Wherein
$C_1$-$C_{18}$ alkyl substituted optionally by aryl, alkyl, aryloxy, alkyloxy, heteroatoms and/or heterocycles is for example methyl, ethyl, propyl, ispropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, $C_6$-$C_{12}$ aryl substituted optionally by aryl, alkyl, aryloxy, alkyloxy, heteroatoms and/or heterocycles is for example phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$ cycloalkyl substituted optionally by aryl, alkyl, aryloxy, alkyloxy, heteroatoms and/or heterocycles is for example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, and also a saturated or unsaturated bicyclic system such as norbornyl or norbornenyl, for example, a five- to six-membered heterocycle containing oxygen, nitrogen and/or sulfur atoms is for example furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

A divalent organic radical here is understood to be unsubstituted or halogen-, $C_1$-$C_8$-alkyl-, $C_2$-$C_8$-alkenyl-, carboxyl-, $C_1$-$C_8$-alkyloxycarbonyl-, $C_1$-$C_{20}$-acyl-, $C_1$-$C_8$-alkoxy-, $C_6$-$C_{12}$-aryl-, hydroxyl-, hydroxy-substituted $C_1$-$C_8$-alkyl-substituted $C_6$-$C_{12}$-arylene, $C_3$-$C_{12}$-cycloalkylene, $C_1$-$C_{20}$-alkylene or else $C_2$-$C_{20}$-alkylene which is interrupted by one or more oxygen and/or sulfur atoms and/or by one or more substituted or unsubstituted imino groups and/or by one or more —(CO)—, —O(CO)O—, —(NH)(CO)O—, —O(CO)(NH)—, —O(CO)— or —(CO)O— groups.

Therein $C_6$-$C_{12}$-arylene is for example 1,2-, 1,3- or 1,4-phenylene, 1,2-, 1,3- or 1,4-tolylene, 4,4'-biphenylene, 1,2- or 1,8-naphthylene.

$C_3$-$C_{12}$-cycloalkylene is 1,1-, 1,2-, 1,3- or 1,4-cyclohexylene, 1,2- or 1,3-cyclopentylene.

$C_1$-$C_{20}$-alkylene is methylene, 1,2-ethylene, 1,2-propylene, 1,3-propylene, 1,4-butylene, 1,6-hexylene, 2-methyl-1,3-propylene, 2-ethyl-1,3-propylene, 2,2-dimethyl-1,3-propylene or 2,2-dimethyl-1,4-butylene.

$C_2$-$C_{20}$-alkylene interrupted by heteroatoms is for example 1-oxa-1,3-propylene, 1,4-dioxa-1,6-hexylene, 1,4,7-trioxa-1,9-nonylene, 1-oxa-1,4-butylene, 1,5-dioxa-1,8-octylene, 1-oxa-1,5-pentylene, 1-oxa-1,7-heptylene, 1,6-dioxa-1,10-decylene, 1-oxa-3-methyl-1,3-propylene, 1-oxa-3-methyl-1,4-butylene, 1-oxa-3,3-dimethyl-1,4-butylene, 1-oxa-3,3-dimethyl-1,5-pentylene, 1,4-dioxa-3,6-dimethyl-1,6-hexylene, 1-oxa-2-methyl-1,3-propylene, 1,4-dioxa-2,5-dimethyl-1,6-hexylene, 1-oxa-1,5-pent-3-enylene, 1-oxa-1,5-pent-3-enylene, 1,4-diaza-1,4-butylene, 1-aza-1,3-propylene, 1,4,7-triaza-1,7-heptylene, 1,4-diaza-1,6-hexylene, 1,4-diaza-7-oxa-1,7-heptylene, 4,7-diaza-1-oxa-1,7-heptylene, 4-aza-1-oxa-1,6-hexylene, 1-aza-4-oxa-1,4-butylene, 1-aza-1,3-propylene, 4-aza-1-oxa-1,4-butylene, 4-aza-1,7-dioxa-1,7-heptylene, 4-aza-1-oxa-4-methyl-1,6-hexylene, 4-aza-1,7-dioxa-4-methyl-1,7-heptylene, 4-aza-1,7-dioxa-4-(2'-hydroxyethyl)-1,7-heptylene or 4-aza-1-oxa(2'-hydroxyethyl)-1,6-hexylene.

Preferred compounds (D) are those in which the individual groups have the following definitions:

$R^1$ may preferably be hydrogen, $C_1$-$C_{18}$ alkyl, $C_6$-$C_{12}$ aryl or $C_5$-$C_{12}$ cycloalkyl, it being possible for each of these to be substituted optionally by aryl, alkyl, aryloxy, alkyloxy, heteroatoms and/or heterocycles; more preferably hydrogen or $C_1$-$C_{18}$ alkyl, it being possible for each of these to be substituted optionally by aryl, alkyl, aryloxy, alkyloxy, heteroatoms and/or heterocycles; very preferably hydrogen or unsubstituted $C_1$-$C_{18}$ alkyl; and more particularly hydrogen.

With particular preference the radical $R^1$ is hydrogen, methyl, ethyl, isopropyl or phenyl, very preferably hydrogen or methyl, and more particularly hydrogen.

X may with preference be a sulfide group.

$R^2$ may preferably be optionally substituted $C_6$-$C_{12}$-arylene, $C_3$-$C_{12}$-cycloalkylene, $C_1$-$C_{20}$-alkylene; more preferably optionally substituted $C_3$-$C_{12}$-cycloalkylene or $C_1$-$C_{20}$-alkylene; very preferably optionally substituted $C_1$-$C_{20}$-alkylene; and more particularly unsubstituted $C_1$-$C_{20}$-alkylene.

Among the alkylene groups, $R^2$ may preferably be optionally substituted, preferably unsubstituted, alkylene groups comprising 1 to 5 carbon atoms, more preferably alkylene groups comprising 1 to 3, and very preferably alkylene groups comprising 2, carbon atoms.

With preference $R^2$ may be 1,2-ethylene, 1,2-propylene, 1,3-propylene, 1,2-butylene, 1,2-phenylene or 1,4-phenylene, more particularly 1,2-ethylene.

$R^3$ may preferably by hydrogen, $C_1$-$C_{18}$ alkyl, $C_6$-$C_{12}$ aryl or $C_5$-$C_{12}$ cycloalkyl, it being possible for each of these to be substituted optionally by aryl, alkyl, aryloxy, alkyloxy, heteroatoms and/or heterocycles; more preferably hydrogen or $C_1$-$C_{18}$ alkyl, it being possible for each of these to be substituted optionally by aryl, alkyl, aryloxy, alkyloxy, heteroatoms and/or heterocycles; very preferably hydrogen or unsubstituted $C_1$-$C_{18}$ alkyl; and more particularly hydrogen.

With preference $R^3$ may be hydrogen, methyl, ethyl, isopropyl, n-butyl, tert-butyl, phenyl, benzyl, cyclohexyl or cyclopentyl, more preferably hydrogen or methyl, and very preferably hydrogen.

$R^4$ may preferably by hydrogen, $C_1$-$C_{18}$ alkyl, $C_6$-$C_{12}$ aryl or $C_6$-$C_{12}$ cycloalkyl, it being possible for each of these to be substituted optionally by aryl, alkyl, aryloxy, alkyloxy, heteroatoms and/or heterocycles; more preferably $C_1$-$C_{18}$ alkyl or $C_6$-$C_{12}$ aryl, it being possible for each of these to be substituted optionally by aryl, alkyl, aryloxy, alkyloxy, heteroatoms and/or heterocycles; very preferably unsubstituted $C_1$-$C_{18}$ alkyl or unsubstituted $C_6$-$C_{12}$ aryl; and more particularly unsubstituted $C_1$-$C_{18}$ alkyl.

Among the optionally substituted and preferably unsubstituted, straight-chain or branched alkyl groups, $R^4$ may comprise preferably 3 to 10 carbon atoms, more preferably 4 to 7 carbon atoms.

Preferred radicals in which $R^4$ is an unsubstituted, straight-chain or branched alkyl group are methyl, ethyl, propyl, isopropyl, n-butyl, sec-butyl, tert-butyl, pentyl, 1-ethylpentyl, hexyl, heptyl, octyl, 2-ethylhexyl, phenyl or benzyl; particularly preferred radicals $R^4$ are propyl, isopropyl, n-butyl, sec-butyl, tert-butyl, pentyl, 1-ethylpentyl, hexyl, heptyl, octyl or 2-ethylhexyl, and especially preferred radicals $R^4$ are n-butyl, sec-butyl, tert-butyl, and pentyl isomers.

One preferred radical in which $R^4$ is a substituted alkyl group is benzyl.

One preferred radical in which $R^4$ is an aryl group is phenyl.

With particular preference the group —X—$R^1$ is a sulfanyl group (—S—H).

Especially preferred compounds (D) are those in which $R^1$ is hydrogen and X is a sulfide group and $R^2$ is 1,2-ethylene and $R^3$ is hydrogen.

Particularly preferred compounds (D) are the formal reaction products of 2-sulfanylethylamine or 3-sulfanylpropylamine, preferably 2-sulfanylethylamine, with alkanecarboxylic acids, preferably propionic acid, n-butanoic acid, isobutyric acid (2-methylpropanoic acid), valeric acid (n-pentanoic acid), isovaleric acid (3-methylbutyric acid), and caproic acid.

Preferred compounds (D) are
N-(2-mercaptoethyl)pentanamide ($R^1$=H, X=S—, $R^2$=1,2-ethylene, $R^3$=H and $R^4$=n-butyl),
N-(2-mercaptoethyl)butanamide ($R^1$=H, X=S—, $R^2$=1,2-ethylene, $R^3$=H and $R^4$=n-propyl),
N-(2-mercaptoethyl)hexanamide ($R^1$=H, X=S—, $R^2$=1,2-ethylene, $R^3$=H and $R^4$=n-pentyl),
N-(2-mercaptoethyl)-2-ethylhexanamide ($R^1$=H, X=S—, $R^2$=1,2-ethylene, $R^3$=H and $R^4$=1-ethylpentyl), N-(2-mercaptoethyl)-2,2-dimethylpropionamide ($R^1$=H, X=S—, $R^2$=1,2-ethylene, $R^3$=H and $R^4$=tert-butyl),
N-(2-mercaptoethyl)benzamide ($R^1$=H, X=S—, $R^2$=1,2-ethylene, $R^3$=H, and $R^4$=phenyl) and
N-(2-mercaptoethyl)-2-phenylacetamide ($R^1$=H, X=S—, $R^2$=1,2-ethylene, $R^3$=H, and $R^4$=benzyl).

Particularly preferred compounds (D) are N-(2-mercaptoethyl)pentanamide and N-(2-mercaptoethyl)benzamide.

Compounds (D) of this kind are not disclosed in GB 2324084 A. The adducts of amidoamines and ethylene sulfide that are disclosed in GB 2324084 A are reaction products of the free amino function of the amidoamine with ethylene sulfide. The reaction of the amido group with ethylene sulfide, which could formally lead to products (D), does not take place, since the reactivity of the amido group is too low and since, moreover, said amido group is sterically shielded.

Particularly in the case of those compounds (D) in which the group —X—$R^1$ is a sulfanyl group (—S—H), it is also possible to a certain extent for there to be the corresponding disulfide (D1) of the formula (II)

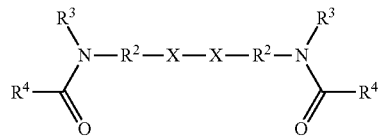

present
in which $R^2$, $R^3$ and $R^4$ have the definitions stated above.

The fraction of the disulfide (D1) ought in general not to exceed 30% by weight, based on the compounds (D), preferably not more than 20% by weight, more preferably not more than 10% by weight, very preferably not more than 5% by weight, and more particularly not more than 3% by weight.

In one embodiment of the present invention the compound (D) may also formally be the reaction product of a polyfunctional carboxylic acid, preferably a dicarboxylic acid, with a compound $R^1$—X—$R^2$—$NHR^3$ of formula (II)

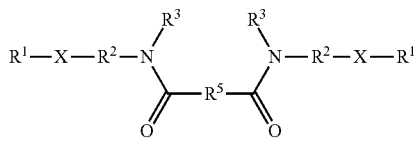

in which $R^5$ may be divalent organic radical.

Preferred radicals $R^5$ are optionally substituted $C_6$-$C_{12}$-arylene, $C_3$-$C_{12}$-cycloalkylene, $C_1$-$C_{20}$-alkylene, more preferably optionally substituted $C_6$-$C_{12}$-arylene or $C_1$-$C_{20}$-alkylene, very preferably optionally substituted $C_1$-$C_{20}$-alkylene, and more particularly unsubstituted $C_1$-$C_{20}$-alkylene.

Preferably $R^5$ is 1,2-phenylene, 1,3-phenylene, 1,4-phenylene, methylene, 1,2-ethylene, 1,3-propylene or 1,4-butylene.

The present invention accordingly also provides for the use of the compounds (D) as corrosion inhibitors in coating materials for use in corrosion control.

The present invention further provides the new compounds N-(2-mercaptoethyl)-2-ethylhexanamide ($R^1$=H, X=S—, $R^2$=1,2-ethylene, $R^3$=H and $R^4$=1-ethylpentyl) and N-(2-mercaptoethyl)-2,2-dimethylpropionamide ($R^1$=H, X=S—, $R^2$=1,2-ethylene, $R^3$=H and $R^4$=tert-butyl).

Found additionally has been a method of applying corrosion control coats to metallic surfaces by treating the metallic surface with a formulation at least comprising a binder, a pigment and/or a filler, and a corrosion preventive agent, the corrosion preventive agent being at least one compound (D).

The method of the invention can be used to provide protection against corrosion to any metallic surfaces, in particular those which in the course of service are in contact with atmospheric air, although the surfaces in question may also be those which in the course of service are in contact with water, soil or other corrosive media.

The metallic surfaces to be protected against corrosion by means of the method of the invention may in principle be any desired surfaces. Preferably, though, they are the surfaces of metallic structures or metal constructions and/or their required components. Metal constructions and structures are typically joined from construction-grade steel, such as steel girders, steel pipes or steel panels, by riveting, welding or screwing, to form corresponding constructions. In one embodiment of the invention the coated articles may be stationary metallic structures such as, for example, buildings, bridges, power masts, tanks, containers, buildings, pipelines, power plants, chemical plants, ships, cranes, posts, bulkheads, valves, pipes, tanks, fittings, flanges, couplings, halls, roofs, and construction-grade steel. In the case of this embodiment, corrosion control coatings are typically applied by spreading or spraying on site. This corrosion control may be either first-time control or a renovation. The drying and curing of such corrosion control coatings take place under atmospheric conditions, in other words at ambient temperature, and in the presence of air and typical atmospheric humidity. The relative atmospheric humidity may have any desired value, but is preferably between 10% and 80% and more preferably between 30% and 70%. Depending on the degree of protection required, the protection of surfaces against corrosion by means of corrosion control coatings is also referred to as light, medium, and heavy duty corrosion control.

As far as the nature of the metal is concerned, any desired metals may be involved in principle. In particular, however, the metals or alloys involved are those which are typically employed as metallic construction materials and require protection from corrosion.

The surfaces in question are, in particular, those of iron, steel, zinc, zinc alloys, aluminum or aluminum alloys. Steel may comprise the typical alloying components known to the skilled worker. The surfaces in question may be surfaces of structures composed entirely of the stated metals or alloys. Alternatively they may be the surfaces of structures coated with Zn, Zn alloys, Al or Al alloys, the structures themselves being composed of other materials, as for example of other metals, alloys, polymers or composites. In one preferred embodiment of the invention the surfaces are those of untreated steel or of galvanized and/or aluminized steel.

Zinc alloys or aluminum alloys are known to the skilled worker. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The term "zinc alloy" is also intended to include Al/Zn alloys in which Al and Zn are present in approximately equal quantity. The skilled worker selects the identity and amount of alloying constituents in accordance with the desired end application. Zn or aluminum coatings can be applied to steel by means for example of hot dip methods, such as hot dip galvanizing, or by means of sherardizing. Where the component is stationary or the geometry of the component does not permit otherwise, corresponding coats can also be applied by means of thermal spraying (spray galvanizing, spray aluminizing).

The preparation employed for applying corrosion control coats to metallic surfaces comprises at least one binder. This binder may optionally also contain crosslinkable groups. Binders for corrosion control paints and coatings are known to the skilled worker.

The preparation employed in accordance with the invention for applying coating materials comprises at least one binder (A) and also crosslinkable components (B). The crosslinkable components may be at least one crosslinker, which is used in addition to a binder, or may in this case be crosslinkable groups, which are joined to the binder. The binder can of course also have crosslinkable groups and a crosslinker can be used additionally.

A variety of possible combinations arise here. By way of example, binder and crosslinker can be used separately from one another. In that case the binder comprises reactive functional groups which are able to react with complementary reactive functional groups in the crosslinkers. Alternatively the binders may also be self-crosslinking binders, comprising reactive functional groups which are able to enter into crosslinking reactions with groups of their own kind ("with themselves") or with complementary reactive functional groups on the same polymer. It is possible for exclusively the crosslinkers to react with one another.

The binders (A) may be the typical binders. Examples of suitable binders comprise (meth)acrylate (co)polymers, partially hydrolyzed polyvinyl esters, polyesters, alkyd resins, polylactones, polycarbonates, polyethers, epoxy resin-amine adducts, polyureas, polyamides, polyimides or polyurethanes. It is of course also possible to use mixtures of different polymers, provided the mixing does not give rise to any unwanted effects.

Curing may proceed by a variety of mechanisms, depending on the nature of the binder system employed. By way of example the curing involved may be purely physical curing, produced by the evaporation of the solvent used. It may also be oxidative curing through reaction of the binder system with the oxygen in the air. Finally, it may also be chemical crosslinking (reactive crosslinking). Reactive binder systems comprise crosslinkable components. The crosslinkable components may be of low molecular mass, oligomeric or polymeric. The systems in question may be preferably one-component (1K) or else two-component (2K) systems. Reactively crosslinking systems also comprise moisture-curing binder systems, where the atmospheric moisture functions as a curing component. It will be appreciated that a binder system may also cure through a combination of different curing methods. In the case of 2K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes or styrene-butadiene polymers.

The amount of binders (A) in the formulation is 15% to 70% by weight, based on the amount of all the components of, the formulation, including the solvent. It is set by the skilled worker in accordance with the desired properties of the coating. The amount is preferably 20% to 60% by weight and more preferably 25% to 50% by weight.

With particular preference the polymer of the binder (A) is selected from the group consisting of (A1) polyacrylates,
(A2) polyurethanes, and
(A3) styrene-butadiene polymers.

Additionally possible are (A4) alkyd resins.

Polyacrylates (A1) are generally composed of

A1a) 40% to 100%, preferably 60% to 100%, more preferably 80% to 100% by weight of at least one principal monomer containing a free-radically polymerizable group, A1b) 0% to 40%, preferably 0% to 25%, more preferably 0% to 15% by weight of further copolymerizable monomers other than A1a), containing a free-radically polymerizable group, and A1c) 0% to 4%, preferably 0.01% to 2%, more preferably at least 0.05% to 1% by weight of at least one crosslinker.

Principal monomers A1a) comprise a free-radically polymerizable group and are selected from $C_1$-$C_{20}$ alkyl (meth)acrylates, vinyl esters of carboxylic acid comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms, or mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate.

Suitability is also possessed in particular by mixtures of the (meth)acrylic acid alkyl esters.

Vinyl esters of carboxylic acids having 1 to 20 C atoms are for example vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Vinyl ethers include for example vinyl methyl ether or vinyl isobutyl ether. Preferred vinyl ethers are those of alcohols comprising 1 to 4 C atoms.

Suitable monomers (A1a) are preferably the alkyl (meth) acrylates, preferably ($C_2$ to $C_{10}$ alkyl)acrylates and methacrylates, and the vinylaromatics, and also mixtures of these compounds.

Very particular preference is given to methyl methacrylate, n-butyl acrylate, n-hexyl acrylate, octyl acrylate, 2-ethylhexyl acrylate, and styrene, and also mixtures of these monomers, as monomers (A1a).

Especial preference is given to methyl methacrylate, n-butyl acrylate, 2-ethylhexyl acrylate, and styrene, and also mixtures of these monomers, as monomers (A1a).

Further copolymerizable monomers A1b) are monomers which have a free-radically polymerizable group that are different from those specified under (A1a), preferably monomers which besides the free-radically polymerizable double bond comprise at least one, preferably 1 to 3, more preferably 1 to 2, and very preferably one further functional group, such as hydroxy groups, carboxamide groups or carboxyl groups, for example, especially $C_1$-$C_{10}$ hydroxyalkyl (meth)acrylates, (meth)acrylamide, ethylenically unsaturated acids or acid anhydrides, especially carboxylic acids, such as (meth) acrylic acid, crotonic acid or dicarboxylic acids, such as itaconic acid, maleic acid or fumaric acid, for example.

(Meth)acrylic acid stands in this description for methacrylic acid and acrylic acid.

Crosslinkers A1c) are of the kind which have at least two free-radically polymerizable double bonds, preferably 2 to 6, more preferably 2 to 4, very preferably 2 to 3, and in particular 2.

The at least two free-radically polymerizable double bonds of the crosslinkers A1c) may be selected from the group consisting of (meth)acrylic, vinyl ether, vinyl ester, allyl ether, and allyl ester groups.

These free-radically polymerizable groups in the crosslinkers A1c) may be alike or different.

Examples of compounds A1c) having alike free-radically polymerizable groups are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentyl glycol di(meth)acrylate, trimethylolpropanetriol di(meth)acrylate, pentaerythritol tetra(meth)acrylate, 1,4-butanediol divinyl ether, 1,6-hexanediol divinyl ether, 1,4-cyclohexanediol divinyl ether, and divinylbenzene. Preference is given to divinylbenzene, 1,4-butanediol diacrylate, and 1,6-hexanediol diacrylate.

Examples of compounds A1c) with different free-radically polymerizable groups are allyl acrylate, allyl methacrylate, methallyl acrylate, methallyl methacrylate, but-3-en-2-yl (meth)acrylate, but-2-en-1-yl (meth)acrylate, 3-methyl-but-2-en-1-yl (meth)acrylate, esters of (meth)acrylic acid with geraniol, citronellal, cinnamyl alcohol, glycerol monoallyl or diallyl ether, trimethylolpropane monoallyl or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether, and, furthermore, diallyl itaconate. Allyl methacrylate is particularly preferred.

The polyacrylates (A1) can be prepared in a conventional manner in accordance with the processes of emulsion polymerization, which are common knowledge, from the monomers, using the typical emulsifying and dispersing assistants and polymerization initiators.

Dispersants suitable for implementing free-radically aqueous emulsion polymerizations are emulsifiers that are typically employed, in amounts of 0.1% to 5%, in particular of 0.2% to 3%, by weight, or protective colloids in amounts of 5% to 40%, in particular of 5% to 25%, by weight, based on the monomers.

Customary emulsifiers are, for example, ammonium salts or alkali metal salts of higher fatty alcohol sulfates, such as Na n-lauryl sulfate, fatty alcohol phosphates, ethoxylated $C_8$ to $C_{10}$ alkylphenols having a degree of ethoxylation of 3 to 30, and ethoxylated $C_8$ to $C_{25}$ fatty alcohols having a degree of ethoxylation of 5 to 50. Also possible are mixtures of non-ionic and ionic emulsifiers. Also suitable are phosphate- or sulfate-functional, ethoxylated and/or propoxylated alkylphenols and/or fatty alcohols. Further suitable emulsifiers are listed in Houben-Weyl, Methoden der organischen Chemie, Volume XIV, Makromolekulare Stoffe [Macromolecular compounds], Georg Thieme Verlag, Stuttgart, 1961, pages 192 to 209.

Suitable protective colloids are high molecular mass natural substances such as starch, methylcellulose, pectins and gelatin, synthetic substances such as polyvinyl alcohol and polyvinylpyrrolidone. Further protective colloids are described at length in Houben-Weyl, loc. cit., pages 411 to 420.

Suitable by way of example are polyurethanes and copolymers of olefinic monomers with (meth)acrylic acid and/or maleic acid.

Suitable polymerization initiators include all those capable of triggering a free-radical emulsion polymerization in aqueous media. They are used generally in amounts of 0.1% to 10%, preferably of 0.2% to 4%, by weight, based on the monomers. Typical compounds are inorganic peroxides, such as sodium and ammonium peroxidisulfate, and hydrogen peroxide, organic peroxides such as dibenzoylperoxide or tert-butyl hydroperoxide, and azo compounds such as azoisobutyrodinitrile. These initiators are suitable for reaction temperatures of from 50 to 100° C., that are typical of free-radical emulsion polymerizations. If lower reaction temperatures of about 40 to 60° C. are desired, preference is given to redox systems such as combinations of percompounds and a reducing coinitiator—the sodium salt of hydroxymethanesulfinic acid, ascorbic acid or iron(II) salts.

Dispersions which can be used in accordance with the invention include both primary and secondary dispersions. In the case of primary dispersions the base monomers are polymerized directly in the aqueous phase, in the form for example of an emulsion or miniemulsion, in which the monomers are dispersed in the aqueous phase with a droplet diameter of 0.1 to 0.2 μm, whereas in the case of secondary dispersions pre-prepared polymers are dispersed in a further step of the process, usually by polymerization in an organic solvent, with subsequent dispersing of the polymer in water, followed if desired by removal of the solvent from the dispersion, preferably by means of distillation.

The preparation of aqueous polymer dispersions by the process of free-radical emulsion polymerization is known per se (cf. Houben-Weyl, Methoden der organischen Chemie, Volume XIV, Makromolekulare Stoffe, loc. cit., pages 133ff).

A process which has been found particularly appropriate is a feed process, where the starting point is an initial charge consisting of a portion of the monomers, generally up to 20% by weight, water, emulsifier, and initiator. The remainder of the monomers and, if desired, regulators in emulsified form, and additionally an aqueous solution of further polymerization initiator, are added in tune with the rate of the polymerization.

Following the (co)polymerization it is possible for at least some of the acid groups present in the (co)polymer to be neutralized. This can be done, for example, using oxides, hydroxides, carbonates or hydrogen carbonates of alkali metals or alkaline earth metals, preferably hydroxides, which may be in association with any desired counterion or two or more thereof, examples being $Li^+$, $Na^+$, $K^+$, $Cs^+$, $Mg^{2+}$, $Ca^{2+}$ or $Ba^{2+}$. Also suitable for the neutralization are ammonia or amines, especially tertiary amines, such as methylamine, dimethylamine, trimethylamine, ethylamine, diethylamine, triethylamine, tributylamine, diisopropylethylamine, benzyldimethylamine, monoethanolamine, diethanolamine, triethanolamine, hydroxyethyldimethylamine, hydroxyethyldiethylamine, monopropanolamine, dipropanolamine, tripropanolamine, piperidine, piperazine, N,N'-dimethylpiperazine, morpholine or pyridine.

Ammonia is preferred for the neutralization. Preferably 50 to 100 mol % of the acid groups in the (co)polymer are neutralized, more preferably 75-100 mol %, very preferably 90-100, and in particular 100 mol %.

The aqueous polymer dispersion of the polyacrylates (A1) preferably has a solids content of 35% to 65%, more preferably of 45% to 55% by weight.

The glass transition temperature, Tg, of the copolymers is preferably in the range from 0 to 60° C., more preferably in the range from 5 to 40° C. (measured by the DSC method in accordance with DIN EN ISO 11357).

In a third, preferred embodiment of the invention the binder system is an aqueous or predominantly aqueous dispersion of polyurethanes (A2).

Aqueous dispersions of polyurethanes (A2) for producing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A2) may be either primary dispersions or secondary dispersions.

Polyurethanes for aqueous dispersions can be synthesized, in a way which is known in principle, from typical diisocyanates and also diols. With a view to effective film formation and good elasticity, diols particularly suitable for this purpose are those having a number-average molecular weight, $M_n$, of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, moreover, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups. Preferably they are acidic groups. For use as binders for the formulation it is possible with preference for some or all of the acid groups to be neutralized with suitable bases. Preferred for this purpose are ammonia or amines. Further details on such polyurethane dispersions and also on their preparation are described at length in WO 2005/005565, page 4 line 13 to page 14 line 14. Further examples of suitable polyurethanes are disclosed in U.S. Pat. No. 5,707,941 or in WO 2004/101638, particularly page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A2) having an average particle size of not more than 1000 nm, preferably less than 500, more preferably less than 200 nm, and in particular 20 to 200 nm.

Styrene-butadiene polymers (A3) can be synthesized by free-radically initiated aqueous emulsion polymerization of

| | |
|---|---|
| A3a) 19.9 to 80 parts by weight | of conjugated aliphatic dienes [monomers A3a)], |
| A3b) 19.9 to 80 parts by weight | of vinylaromatic compounds [monomers A3b)], |
| A3c) 0 to 10 parts by weight | of ethylenically unsaturated carboxylic acids and/or dicarboxylic acids and/or the corresponding carboxamides [monomers A3c)], |
| A3d) 0 to 20 parts by weight and | of ethylenically unsaturated carbonitriles [monomers A3d)] |
| A3e) 0 to 20 parts by weight | of copolymerizable compounds [monomers A3e)] other than monomers A3b) to A3d), | the total amount of ethylenically unsaturated monomers A3a) to A3e) being 100 parts by weight, in the presence of water and 0.1 to 5 parts by weight of emulsifiers, based on the total monomer amount.

The aqueous copolymer dispersions are prepared using frequently

| | |
|---|---|
| 25 to 70 parts by weight | of monomers A3a), |
| 25 to 70 parts by weight | of monomers A3b), |
| 0 to 8 parts by weight | of monomers A3c), |
| 0 to 15 parts by weight | of monomers A3d), and |
| 0 to 15 parts by weight | of monomers A3e) |
| and often | |
| 25 to 60 parts by weight | of monomers A3a), |
| 25 to 70 parts by weight | of monomers A3b), |
| 0.5 to 5 parts by weight | of monomers A3c), |
| 0 to 10 parts by weight | of monomers A3d), and |
| 0 to 10 parts by weight | of monomers A3e). |

Suitable conjugated aliphatic dienes [monomers A3a)] include preferably butadiene, isoprene, penta-1,3-diene, dimethylbutadiene and/or cyclopentadiene, preferably butadiene.

Vinylaromatic compounds [monomers A3b)] include, in particular, styrene, α-methylstyrene and/or vinyltoluene, preferably styrene.

Ethylenically unsaturated carboxylic acids and/or dicarboxylic acids [monomers A3c)] used with preference are α,β-monoethylenically unsaturated monocarboxylic and dicarboxylic acids having 3 to 6 C atoms, such as acrylic acid, methacrylic acid, maleic acid, fumaric acid, itaconic acid, preferably (meth)acrylic acid, and itaconic acid, more preferably acrylic acid. Carboxamides used are the amides of the above-mentioned ethylenically unsaturated carboxylic acids, preferably (meth)acrylamide.

Preferred ethylenically unsaturated carbonitriles are acrylonitrile and/or methacrylonitrile [monomers A3d)] and preferred copolymerizable vinyl compounds [monomers A3e)] are esters of acrylic and/or methacrylic acid in which the alkyl group comprises 22 or fewer carbon atoms, examples being methyl (meth)acrylate, ethyl (meth)acrylate, isopropyl (meth)acrylate, butyl (meth)acrylate, 2-ethylhexyl (meth) acrylate, and also allyl esters of saturated monocarboxylic acids, vinyl esters, vinyl ethers, vinyl ketones, dialkyl esters of unsaturated dicarboxylic acids, vinyl acetate and/or vinylpyridine, vinyl chloride, vinylidene chloride.

The emulsifiers are used preferably in amounts of 0.2 to 4.5 parts by weight per 100 parts by weight of the abovementioned monomers A3a) to A3e). Emulsifiers that are suitable include, in particular, ethoxylated fatty alcohols and sulfuric monoesters of ethoxylated fatty alcohols, composed in each case of a linear or branched alkyl radical having 8 to 18 carbon atoms, which is linked via an ether group to a poly- or oligo-ethyleneoxy sequence. Suitable poly- or oligo-ethyleneoxy sequences include ethylene oxide oligomers having a degree of polymerization of 2 to 30 ethylene oxide units, preferably 2 to 7 ethylene oxide units.

Particularly preferred fatty alcohol ethers and fatty alcohol ether sulfates are those comprising a $C_8$-$C_{18}$ alkyl radical as fatty alcohol, e.g., caprylyl, capryl, lauryl, myristyl, oleyl or elaidyl alcohol. Particular preference is given to lauryl oligo-ethyleneoxysulfate, palmityl oligoethyleneoxysulfate, stearyl oligoethyleneoxysulfate, and oligoethyleneoxysulfate, the oligoethyleneoxy sequence being composed with particular preference of 2 to 7 ethylene oxide units.

As fatty alcohol in this case it is possible to use the pure starting compound or else the mixtures of homologous and isomeric alkyl radicals that are frequently obtained in the case of the synthetic fatty alcohols, an example being a mixture of $C_{12}$ and $C_{13}$ fatty alcohols. It is typical for the degree of ethoxylation to express only the average value of a distribution.

The free acid group of the sulfate radical is typically present in neutralized form as an ammonium salt or an alkali metal salt, although neutralization may also be carried out during the metered addition, by the base that is used.

As emulsifiers it is additionally possible to use esters or monoesters of alkylpolyoxyethylenesulfosuccinates. In these compounds the sulfosuccinic acid is singly or doubly esterified with poly- or oligoethylene oxide having 2 to 30 ethylene oxide units, preferably 2 to 7 ethylene oxide units, in particular 2 to 5 ethylene oxide units, the end group of said esters and monoesters consisting of an alkyl radical with 8 to 18 carbon atoms, which is linear or branched. $C_8$-$C_{18}$ carbon-comprising alkyl radicals include in particular the following: caprylyl, capryl, lauryl, myristyl, stearyl, and elaidyl alcohol.

The free-radical aqueous emulsion polymerization is initiated in a manner familiar to the skilled worker by means of water-soluble free-radical initiators. Particular such initiators include organic and/or inorganic peroxides, such as alkali metal peroxodisulfates and/or azo compounds, for example, or combined systems composed of at least one reducing agent and at least one peroxide and/or hydroperoxide, such as tert-butyl hydroperoxide and the sodium salt of hydroxymethanesulfinic acid, or hydrogen peroxide and ascorbic acid, or combined systems additionally comprising a small amount of a metal compound which is soluble in the polymerization medium and whose metallic component is able to exist in a plurality of valence states, an example being ascorbic acid/iron(II) sulfate/hydrogen peroxide, in which the ascorbic acid frequently may be replaced by the sodium salt of hydroxymethanesulfinic acid, sodium sulfite, sodium hydrogen sulfite and/or sodium disulfite and the hydrogen peroxide by tert-butyl hydroperoxide or alkali metal peroxide sulfates and/or ammonium peroxodisulfates. Instead of a water-soluble iron(II) salt it is common to use a combination of water-soluble Fe/V salts. The initiator system can be added continuously or in stages at the rate of which it is consumed in the course of the free-radical aqueous emulsion polymerization. In each specific case this will depend in a manner known per se both on the chemical nature of the initiator system and on the polymerization temperature. Very particular preference is given to peroxides, examples being alkali metal peroxodisulfates, such as sodium or ammonium peroxodisulfate. The free-radical initiators, which are normally in solution in water, are generally added to the polymerization reactor via a separate feed.

The ideal amount of water-soluble initiators can easily be determined by appropriate preliminary tests. Typically the water-soluble initiators are added in amount of 0.1 to 2.0% by weight, based on the total mass of the monomers to be polymerized.

For the emulsion polymerization it is additionally possible to add the known molecular weight regulators, such as mercapto compounds, tertiary dodecyl mercaptan for example, or dimeric α-methylstyrene, Further auxiliaries can be added as well, such as complexing agents, an example being ethylenediaminetetraacetic acid Na salt (EDTA-Na), for disruptive metal ions, for example; inhibitors, an example being hydroquinone monomethyl ether; or foam suppressants, to the emulsion polymerization. The molecular weight regulators and auxiliaries are known and are described for example in Houben-Weyl, Methoden der organischen Chemie, Vol. XIV/1, p. 297 ff., 1961, Stuttgart.

In one particular embodiment of the emulsion polymerization for preparing the aqueous dispersion of copolymers it can be advantageous to add up to 15% by weight of the total amount of emulsifiers used to the reaction mixture right at the beginning of the polymerization and then to add the remainder, i.e., up to 85% by weight, of the total emulsifiers used within the time taken to reach up to 40% of the total conversion of the starting components.

Also decisive for the desired properties of the aqueous copolymer dispersion is the 1% to 50% neutralization of the copolymerizable carboxylic acids and/or dicarboxylic acids [monomers A3c)] used for the polymerization. Preferably 5% to 45% of the carboxylic acid groups deriving from them are neutralized with bases.

Particularly suitable bases are aqueous solutions of alkali metal oxides or hydroxides, very preferably aqueous ammonium, sodium or potassium hydroxide solutions.

It has proven advantageous if components A3a) to A3e) are supplied to the polymerization reactor during the polymerization via a common supply line. In one embodiment of the process the components A3a) to A3e) and at least part of the water are mixed to an emulsion by a mixing means during their supply.

Particularly suitable mixers are dynamic mixers, whose mixing elements comprise moving parts, and static mixers, i.e., mixing elements without moving parts in the interior, which operate in particular in accordance with the inline principle. Suitable mixers are described for example in A. Echte, Handbuch der technischen Polymerchemie, VCH Verlagsgesellschaft Weinheim, p. 104 ff. (1993).

Examples of suitable dynamic inline mixers are the Kratz heat exchangers described in ZFL-Zeitschrift für Lebensmittelternologie und-Verfahrenstechnik (1982) 33(3), p. 139 ff., comminuting machines operating on the rotor-stator principle, such as toothed-wheel dispersers, colloid mills and corundum disk mills, and also high-pressure and ultrasonic homogenizers.

Further suitable dynamic inline mixers are continuous tube mixers.

Suitable static inline mixers are for example those described in ZFL-Zeitschrift für Lebensmittelternologie und-Verfahrenstechnik (1982) 33(3) p. 139 ff., such as Ross-ISG mixers, in which the fluid stream is passed through perforated internals which break it down into substreams, which are then displaced laterally and recombined in a different order, or static mixers which comprise two or more fixed mixing elements of identical kind which are installed one behind another in a tube or duct and are each staggered by 90° (e.g., Kenics, Sulzer SMV, and Sulzer SMX mixers).

Further suitable static inline mixers are shear gap mixers, such as the jet dispersers described in EP-B-101 007.

Further suitable mixers also include apparatus for inline emulsification, such as membranes, jet mixers, mixing nozzles, and curved tubular apparatus having a substantially circular or ellipsoidal cross section.

Alkyd resins (A4) are polycondensation resins formed from polyols, polybasic carboxylic acids, and fatty oils or free natural and/or synthetic fatty acids; at least one polyol must have a functionality of three or more.

Examples of suitable dicarboxylic acids comprise aliphatic dicarboxylic acids such as adipic acid, azelaic acid, sebacic acid, dodecanedioic acid, aliphatically cycloaliphatic such as dimer fatty acids, i.e., reaction products of unsaturated fatty acids with one another, cycloaliphatic dicarboxylic acids such as 1,4- or 1,3-cyclohexanedicarboxylic acid, tricyclodecanedicarboxylic acid, and aromatic dicarboxylic acids such as isophthalic acid, terephthalic acid or phthalic acid. It is of course also possible to use derivatives of dicarboxylic acids. Particularly suitable are anhydrides such as phthalic anhydride, hexahydrophthalic anhydride or tetradehydrophthalic anhydride, for example.

Examples of suitable dialcohols comprise aliphatic alcohols such as, for example, ethylene glycol, diethylene glycol, triethylene glycol, propylene glycol, 1,3-butanediol, 1,3-propanediol, 1,4-butanediol, neopentyl glycol, 1-methylpropane-1,3-diol, 2-butyl-2-ethylpropanediol, pentanediols, hexanediols, octanediols, dodecanediol, neopentyl glycol hydroxypivalate, cycloaliphatic alcohols such as 1,4- or 1,3-cyclohexane-dimethanol, 3 (or 4), 8 (or 9)-bis(hydroxymethyl)tricyclo[$5.2.1.0^{2,6}$]decane isomer mixtures and bis(4-hydroxycyclohexyl)methane or -propane, and dimer diols (hydrogenated dimer fatty acids). Of course it is also possible, in a known way, to use derivatives of alcohols, such as esters, for example, especially the corresponding methyl or ethyl esters.

Besides linear binders it is also possible to use branched binders. Suitable monomers for generating branching comprise tricarboxylic acids or their anhydrides such as trimellitic anhydride or trimesic acid and trialcohols such as trimethylolalkanes of which examples include trimethylolethane or trimethylolpropane.

Preferred polyhydric alcohols are glycerol, pentaerythritol, trimethylolethane, trimethylolpropane, various diols such as ethane-/propanediol, diethylene glycol, neopentyl glycol.

Preferred polybasic carboxylic acids are phthalic acid (anhydride) (PAn), isophthalic acid, terephthalic acid, trimellitic anhydride, adipic acid, azelaic acid, sebacic acid.

Examples of suitable oil components or fatty acids include drying oils, such as linseed oil, oiticica oil or tung oil, semi-drying oils, such as soybean oil, sunflower oil, safflower oil, ricinene oil or tall oil, nondrying oils, such as castor oil, coconut oil or peanut oil, or free fatty acids of above oils, or synthetic monocarboxylic acids.

The molar mass of typical alkyd resins is between 1500 and 20 000, preferably between 3500 and 6000. The acid number is preferably 2 to 30 mg KOH/g, or 35-65 mg KOH/g in the case of water-dilutable resins. The OH number is generally up to 300, preferably up to 100 mg KOH/g.

As polymers (A) it is also possible of course to conceive of hybrids or mixtures of the aforementioned polymers.

Preference is given to those polymer dispersions of the invention in which the glass transition temperature as measured by the DSC method to DIN EN ISO 11357 of the polymer (A)
  in the case of polyacrylates (A1) is between 0 and 60° C.,
  in the case of polyurethanes (A2) is up to 75° C. or
  in the case of styrene-butadiene polymers (A3) is between 0 and 60° C.
  in the case of alkyd resins (A4) is between 0 and 60° C.

Particular preference is given to those polymer dispersions of the invention in which the glass transition temperature of the polymer (A)
  in the case of polyacrylates (A1) is between 5 and 40° C.,
  in the case of polyurethanes (A2) is between 0 and 60° C. or
  in the case of styrene-butadiene polymers (A3) is between 5 and 40° C.
  in the case of alkyd resins (A4) is between 5 and 40° C.

Preference is further given to those polymer dispersions in which the DIN 53495 water absorption ("Testing of polymers—Determination of water absorption", method 3 over the course of 24 hours at 23° C.) of the polymer (A)
  in the case of polyacrylates (A1) is not more than 25%, preferably not more than 10%, and more preferably not more than 5% by weight,
  in the case of polyurethanes (A2) is up to 100%, preferably up to 50%, and more preferably up to 30% by weight or
  in the case of styrene-butadiene polymers (A3) is not more than 15%, preferably not more than 8%, and more preferably not more than 3% by weight
  in the case of alkyd resins (A4) is not more than 25%, preferably not more than 10%, and more preferably not more than 5% by weight.

Preference is further given to those polymer dispersions in which the particle size of the polymer (A) as measured using the Malvern® Autosizer 2 C,
  in the case of polyacrylates (A1) is between 50 and 400 nm, more preferably between 80 and 250 nm,
  in the case of polyurethanes (A2) is <1000 nm, more preferably <500 nm, very preferably <200 nm, and in particular between 20 and below 200 nm, or
  in the case of styrene-butadiene polymers (A3) is between 50 and 400 nm, more preferably between 80 and 250 nm
  in the case of alkyd resins (A4) is between 50 and 400 nm, more preferably between 80 and 250 nm.

In one preferred embodiment the pH of the polymer dispersions is adjusted to 6 to 10, more preferably to 7 to 9, and very preferably to 7.5 to 9.

The crosslinking components (B) may contain thermally crosslinking groups.

Examples of suitable thermal crosslinkers are crosslinkers based on epoxides, in which two or more epoxy groups are joined to one another via a linking group. Examples comprise low molecular mass compounds having two epoxy groups, such as hexanediol diglycidyl ether, phthalic acid diglycidyl ether or cycloaliphatic compounds such as 3,4-epoxycyclohexanemethyl 3',4'-epoxycyclohexanecarboxylate. Further examples of suitable crosslinkers comprise crosslinkers based on amino resins, examples being melamine-formaldehyde resins, urea-formaldehyde resins or tris(alkoxycarbonyl)triazines.

Blocked polyisocyanates are used with particular preference as crosslinkers. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2.

Blocking agents are described in D. A. Wicks, Z. W. Wicks, Progress in Organic Coatings, 36, 148-172 (1999), 41, 1-83 (2001) and also 43, 131-140 (2001).

Examples of suitable classes of compound are phenols, imidazoles, triazoles, pyrazoles, oximes, N-hydroxy imides, hydroxybenzoic esters, secondary amines, lactams, CH-acidic cyclic ketones, malonic esters or alkyl acetoacetates. Preference is given to acetone oxime, butanone oxime, ε-caprolactam, 3,5-dimethylpyrazole, diethyl malonate, phenol, and tert-butylbenzylamine.

If a crosslinker is used separately it is usual to use 0.5% to 10%, preferably 1% to 8%, and more preferably 2% to 6% by weight. It will be appreciated that mixtures of different crosslinkers can also be used, provided that this does not have an adverse effect on the properties of the coat.

The compositions of the invention may further comprise at least one component (C) selected from the group of finely divided fillers, pigments, and dyes.

The finely divided filler is generally an inorganic filler. Fillers and/or pigments may of course comprise an additional organic coating, for hydrophobicizing or hydrophilicizing, for example.

The filler ought not to exceed an average particle size of 10 μm. The average particle size is preferably 10 nm to 8 μm, more preferably 100 nm to 5 μm, and, for example, 2 to 4 μm. In the case of round or approximately round particles this FIGURE refers to the diameter; in the case of particles of irregular shape, such as needle-shaped particles, for example, it refers to the longest axis. By particle size is meant the primary particle size. The skilled worker is aware of course that finely divided solids frequently undergo agglomeration into larger particles, which for use must be dispersed intensively. The particle size is chosen by the skilled worker in accordance with the desired properties of the coat.

The pigments may in particular be anticorrosion pigments. These may include both active and passive anticorrosion pigments.

Examples of active anticorrosion pigments comprise, in particular, phosphates, phosphate-containing or modified phosphates such as pigments based on zinc phosphate, zinc aluminum orthophosphate, zinc molybdenum orthophosphate, zinc aluminum molybdenum orthophosphate, calcium hydrogen phosphate, zinc calcium strontium orthophosphate silicate, zinc aluminum polyphosphate, strontium aluminum polyphosphate, zinc calcium aluminum strontium orthophosphate polyphosphate silicate, calcium aluminum polyphosphate silicate. Further examples comprise combinations of inorganic phosphates with electrochemically active organic corrosion inhibitors of low solubility, such as zinc phosphate modified with Zn salts or Ca salts of 5-nitroisophthalic acid. In addition it is also possible to use iron phosphide, zinc hydroxyphosphide, borosilicate pigments such as barium metaborate or zinc borophosphates, molybdates such as zinc molybdate, sodium zinc molybdates or calcium molybdate, pigments having ion exchange properties such as amorphous $SiO_2$ modified with calcium ions, or correspondingly modified silicates, metal oxides such as ZnO, for example, or else metal powders such as zinc dust, for example. It will be appreciated that typical organic anticorrosion pigments can also be used, such as Zn salts or Ca salts of 5-nitroisophthalic acid, for example.

Passive anticorrosion pigments lengthen the diffusion pathways for corrosive components and thereby increase the corrosion resistance. Examples comprise, in particular, platelet-shaped or lamelliform pigments such as mica, hematite, phyllosilicates, linear polysilicates such as wollastonite, talc, or metal plates such as aluminum plates or iron plates.

Further details on anticorrosion pigments are disclosed for example in "*Pigments*, 4.2 *Anticorrosive Pigments*" in *Ullmann's Encyclopedia of Technical Chemistry*, 6th Edition 2000, Electronic Release.

The pigments may also be typical color pigment and/or effect pigment.

By effect pigments are meant all pigments which exhibit a platelet-shaped construction and impart specific decorative color effects to a surface coating. Effect pigments are known to the skilled worker. Examples comprise straight metal pigments such as aluminum, iron or copper pigments, interference pigments, such as titanium dioxide-coated mica, iron oxide coated mica, mixed oxide-coated mica (with titanium dioxide and $Fe_2O_3$, for example), metal oxide-coated aluminum, or liquid-crystal pigments, for example.

Color pigments are, in particular, typical organic or inorganic absorption pigments that can be used in the paint industry. Examples of organic absorption pigments are azo pigments, phthalocyanine, quinacridone, and pyrrolopyrrole pigments. Examples of inorganic absorption pigments are iron oxide pigment, titanium dioxide, and carbon black.

Examples of dyes are azo, azine, anthraquinone, acridine, cyanine, oxazine, polymethine, thiazine, and triarylmethane dyes. These dyes may find application as basic or cationic dyes, mordent dyes, direct dyes, disperse dyes, ingrain dyes, vat dyes, metal complex dyes, reactive dyes, acid dyes, sulfur dyes, coupling dyes or substantive dyes.

Fillers can be used to influence the properties of the coating, such as, for example, hardeners, rheology or the orientation of the effect pigments. Fillers are frequently coloristically inactive; in other words, their inherent absorption is low and the refractive index is similar to that of the coating medium. Examples of fillers comprise talc, calcium carbonate, kaolin, barium sulfate, magnesium silicate, aluminum silicate, crystalline silicon dioxide, amorphous silica, aluminum oxide, microbeads or hollow microbeads made, for example, of glass, ceramic or polymers and having sizes of 0.1-10 μm for example. As fillers it is additionally possible to use any desired solid inert organic particles, such as urea-formaldehyde condensation products, micronized polyolefin wax or micronized amide wax, for example. The inert fillers may each also be used in a mixture. Preferably, however, only one filler is employed in each case.

The fraction of the pigments and/or fillers in the polymer dispersion is preferably 15% to 40%, more preferably 20% to 40%, and very preferably 20% to 35% by volume. The precise amount is set by the skilled worker in accordance with the desired properties of the coat. When conductivity pigments are used, the amounts employed are typically greater than when nonconducting fillers are used.

In contradistinction to other figures, the pigment and/or filler fraction is given here in % by volume, as a measure of the pigment volume concentration (PVC) relative to the bulk density of the pigment and/or filler and to the volume of the polymer dispersion.

The pigment volume concentration is typically defined as the ratio formed from the total volume of the solid inorganic constituents (pigment and fillers) divided by the total volume of the solid inorganic constituents (pigments and fillers) and of the polymer particles of the aqueous binder polymer dispersion; see Ullmanns Enzyklopädie der technischen Chemie, 4th Edition, Volume 15, p. 668.

It will be appreciated that mixtures of different pigments can also be used. The pigments are typically in an amount of 20% to 70% by weight. The precise amount is determined by the skilled worker in accordance with the desired properties of the coat. When conductivity pigments are being used, the amounts employed are typically greater than when nonconducting fillers are used. Preferred amounts for conductive pigments and fillers are 40% to 70% by weight; preferred amounts for nonconductive pigments are 20% to 50% by weight.

Compounds (D) are those as mentioned above.

Preference among the compounds (D) is given to those which have a solubility in ethylene glycol mono-n-butyl ether (butyl glycol) at 23° C. of at least 100 g/l.

Particular preference is given to those combinations of compounds (D) and binders (B) in which the compound (D) or its solubility and the HLB value of the binders (B) is selected such that compound (D) and binders are highly compatible, i.e., exhibit effective compatibility.

The inventively employed compounds (D) are used typically in amount of 0.25% to 10%, preferably of 0.5% to 8%, and more preferably 1% to 6% by weight.

As component (E), the preparation of the invention generally comprises a suitable solvent, in which the components are in solution and/or dispersion, in order to allow uniform application to the surface. It is also possible in principle, however, to formulate the preparation in solvent-free or substantially solvent-free form, as a powder coating material. The use of a solvent is preferred.

Suitable solvents are those capable of dissolving, dispersing, suspending or emulsifying the compounds of the invention. These may be organic solvents, 5% to 25%, preferably 5% to 20%, more preferably 5% to 15% strength ammonia solution in water, or water. Naturally, mixtures of different organic solvents or mixtures of organic solvents with water can also be used. From among the solvents that are possible in principle, the skilled worker makes an appropriate selection in accordance with the desired end use and with the identity of the compound of the invention that is used.

Examples of organic solvents comprise hydrocarbons such as toluene, xylene or mixtures such as are obtained in the refining of crude oil, such as, for example, defined-boiling-range hydrocarbon fractions, ethers such as THF or polyethers such as polyethylene glycol, ether alcohols such as ethylene glycol mono-n-butyl ether (butyl glycol), propylene glycol monoethyl ether, dipropylene glycol monomethyl ether or propylene glycol monomethyl ether, ether glycol acetates such as butyl glycol acetate or propylene glycol monomethyl ether acetate, ketones such as acetone, alcohols such as methanol, ethanol or propanol, or lactams, such as N-methylpyrrolidone, N-ethylpyrrolidone, N-(n-butyl)pyrrolidone or N-cyclohexylpyrrolidone.

Also conceivable are aromatic or aliphatic hydrocarbons or mixtures thereof. Examples of such hydrocarbons are toluene or xylene. Preferred aromatic hydrocarbon mixtures are those which can comprise predominantly aromatic $C_7$ to $C_{14}$ hydrocarbons and encompass a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising these.

Examples thereof are the Solvesso® products from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures comprising paraffins, cycloparaffins, and aromatics are also available commercially under the names Kristalloel (for example, Kristalloel 30, boiling range about 158-198° C., or Kristalloel 60: CAS No. 64742-82-1), white spirit (likewise for example CAS No. 64742-82-1) or solvent naphtha (light: boiling range about 155-180° C.; heavy: boiling range about 225-300° C.). The aromatics content of hydrocarbon mixtures of this kind is generally more than 90% by weight, preferably more than 95%, more preferably more than 98%, and very preferably more than 99% by weight. It may make sense to use hydrocarbon mixtures having a particularly reduced naphthalene content.

In addition it is also possible to use preparations which comprise water or a predominantly aqueous solvent mixture. By this are meant those mixtures which comprise at least 50%, preferably at least 65%, and more preferably at least 80% by weight of water. Further components are water-miscible solvents. Examples comprise monoalcohols such as methanol, ethanol or propanol, higher alcohols such as ethylene glycol or polyether polyols, and ether alcohols such as butyl glycol or methoxypropanol.

The amount of the solvents is chosen by the skilled worker in accordance with the desired properties of the preparation and the desired method of application. As a general rule, the weight ratio of the coat components to the solvent is 10:1 to 1:10, preferably about 2:1, without any, intention that the invention should be restricted to such a ratio. It is of course also possible first to prepare a concentrate and to dilute it to the desired concentration only when on site.

The preparation is prepared by intensively mixing the components of the preparation with the solvents. Appropriate mixing or dispersing assemblies are known to the skilled worker.

In addition to components (A) to (D) and also, optionally, (E), the preparation may further comprise one or more auxiliaries and/or additives (F). Such auxiliaries and/or additives serve to fine-tune the properties of the coat. Their amount generally does not exceed 20% by weight of the sum of all the components bar the solvents, and preferably does not exceed 10%.

Examples of suitable adjuvants are color and/or effect pigments, reactive diluents for the thermal cure, rheological assistants, UV absorbers, light stabilizers, free-radical scavengers, free-radical addition polymerization initiators, thermal crosslinking catalysts, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, antiskinning agents, other corrosion inhibitors, waxes, and matting agents, such as are known from the text book "Lackadditive" [Additives for coatings] by Johan Bieleman, Wiley-VCH, Weinheim, New York, 1998, or from German patent application DE 199 14 896 A 1, column 13 line 56 to column 15 line 54.

Preferred additives are dibutyltin dilaurate as a thermal crosslinking catalyst.

It is also possible for at least one reducing agent to be added to the preparation. Said agent may be, for example, alkali metal salts of sulfurous acid, such as sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or Mohr's salt. With preference, however, the reducing agents are nonionic agents, examples being phenols, and more preferably are isoascorbic acid or ascorbic acid, very preferably ascorbic acid.

The composition of coating materials is typically as follows:
(A) 30-70, more preferably 35-65%, more preferably 40-55% by weight,
(B) 10-50%, more preferably 2.0-40%, more preferably 20-30% by weight,
(C) 15% to 45%, more preferably 20% to 45%, and very preferably 20% to 40% by volume,
(D) 0.05% to 10%, more preferably 0.1% to 8%, and very preferably 0.2% to 6% by weight,
(E) 0% to 45%, more preferably 0% to 35%, very preferably 0% to 25% by weight, with the proviso that the sum of all the constituents makes 100% by weight.

These mixtures of the invention are valuable starting products for the preparation of coating materials for corrosion control.

To implement the process of the invention, the metallic surface is treated with a preparation which comprises at least one compound (D).

In light, medium or heavy duty corrosion control this can be accomplished by means, for example, of spray application or spread application, the applied coat being subsequently cured under atmospheric conditions. It is of course also possible to apply two or more coatings, identical or different in composition, in succession. The overall thickness of corrosion control paints of this kind is determined by the skilled worker in accordance with the desired properties of the corrosion control coat. It amounts in general to at least 40 μm, preferably at least 50 μm, more preferably at least 60 μm, and very preferably at least 80 μm, in particular at least 100 μm, especially at least 125 μm, often at least 150 μm, and even at least 175 μm or at least 200 μm. The upper limit for the overall coat thickness, i.e., the thickness of all applied corrosion control coats together, is 2 mm, preferably less than 1.5 mm, more preferably less than 1 mm, very preferably less than 800 μm, and in particular less than 500 μm.

The curing method is guided by the nature of the crosslinker and takes place as a general rule under atmospheric conditions.

The temperature needed for curing is guided in particular by the crosslinker employed. Highly reactive crosslinkers can be cured at lower temperatures than less reactive crosslinkers.

The term "atmospheric corrosion control" means in the context of this invention that the coating which comprises at least one compound (D) has a coat thickness after drying of at least 40 μm, preferably at least 50 μm, more preferably at least 60 μm, and very preferably at least 80 μm, and a coat thickness of up to 2 mm, preferably less than 1.5 mm, more preferably less than 1 mm, very preferably less than 800 μm, and in particular less than 500 μm, the coating composition curing following application to the surface under typical ambient conditions, i.e., for instance, at ambient temperature or at room temperature, in the presence of air and also typical atmospheric humidity, without the use of additional apparatus or installations. Typical cure temperatures, depending on the ambient environment, are more than 0 to 40° C., preferably 5 to 35° C., more preferably 10 to 30° C., and very preferably 15 to 25° C. in the presence of air and typical atmospheric humidity. The relative humidity may be whatever is desired, and is preferably between 10% and 80% and more preferably between 30% and 70%. It is clear to the skilled worker that the time to complete curing of a given binder system may differ according to the ambient conditions that are actually prevailing.

With particular preference the preparations of the invention are used in corrosion control compositions which are employed in corrosiveness categories C2 (to DIN EN ISO 12944) or higher, preferably in categories C3 or higher, and more preferably in categories C4 or higher.

The corrosiveness categories in accordance with DIN EN ISO 12944, based on the mass loss per unit area or on the thickness reduction after the first year of exposure storage, are defined as follows for unalloyed steel and for zinc:

| | | |
|---|---|---|
| C2 (low corrosivity): | unalloyed steel: | mass loss >10-200 g/m² |
| | | thickness decrease >1.3-25 μm |
| | zinc: | mass loss >0.7-5 g/m² |
| | | thickness decrease >0.1-0.7 μm |
| C3 (medium corrosivity): | unalloyed steel: | mass loss >200-400 g/m² |
| | | thickness decrease >25-50 μm |
| | zinc: | mass loss >5-15 g/m² |
| | | thickness decrease >0.7-2.1 μm |
| C4 (high corrosivity): | unalloyed steel: | mass loss >400-650 g/m² |
| | | thickness decrease >50-80 μm |
| | zinc: | mass loss >15-30 g/m² |
| | | thickness decrease >2.1-4.2 μm |
| C5-I/M (very high): | unalloyed steel: | mass loss >650-1500 g/m² |
| | | thickness decrease >80-200 μm |
| | zinc: | mass loss >30-60 g/m² |
| | | thickness decrease >4.2-8.4 μm |

A further inventive embodiment is represented by the use of the compounds (D) in the corrosion coating of coil coatings, by which are meant coatings on rolled metal strips which following their production are wound up into rolls (called coils) for storage and transportation. These metal strips constitute the starting material for the majority of sheetlike metallic workpieces, examples being automobile parts, bodywork parts, instrument casings, exterior architectural facings, ceiling panels or window profiles. For these purposes the appropriate metal sheets are shaped by means of appropriate techniques such as punching, drilling, folding, profiling and/or deep drawing. Relatively large components, such as automobile bodies, for example, are assembled if necessary by the welding together of a number of individual parts.

Coil coating is the continuous coating of metal strips with usually liquid coating materials. Metal strips with a thickness of 0.2 to 2 mm and a width of up to 2 m are transported at a speed of up to 200 m/min through a coil coating line, and are coated in the process. For this purpose it is possible, for example, to use cold-rolled strips of soft steels or construction-grade steels, electrolytically galvanized thin sheet, hot-dip-galvanized steel strip, or strips of aluminum and/or aluminum alloys. Typical lines comprise a feed station, a strip store, a cleaning and pretreatment zone, a first coating station along with baking oven and downstream cooling zone, a second coating station with oven, laminating station, and cooling, and a strip store and winder.

Characteristic of coil coatings are thin coats of the coating materials which have a dry coat thickness of usually well below 80 μm, often below 60 μm, below 50 μm, and even below 40 μm. Moreover, the metal sheets are processed with a high throughput, necessitating short residence times; in other words, necessitating drying at elevated temperature following application of the coating, in order to make the coating material durable quickly.

Coating processes of this kind are carried out only on lines produced specifically for that purpose.

The difference in the coatings and coating materials from atmospheric corrosion control as compared with corrosion control via coil coating is that in atmospheric corrosion control the coatings have a substantially higher coat thickness than coil coatings and are dried and cured at ambient temperatures, so that drying and curing occupy substantially longer time periods. During this time period the uncured coatings are susceptible to influences such as water spray or weathering effects, so that the requirements imposed on the coating materials are substantially different from those imposed on coil coating materials.

EXAMPLES

Example 1

Synthesis of N-(2-mercaptoethyl)pentanamide

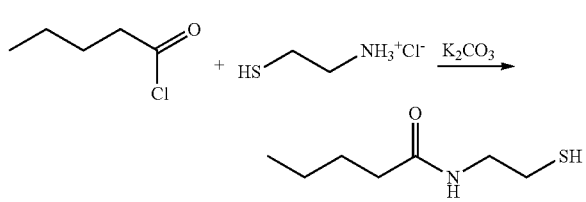

Under a nitrogen atmosphere, 22.7 g of 2-mercaptoethylamine hydrochloride (0.2 mol) and 44.3 g of potassium carbonate (0.32 mol) were introduced at room temperature in solution in 130 ml of water. The solution was warmed to 40°

C. and 12.0 g of valeryl chloride (0.1 mol) were added dropwise over the course of 15 minutes. The batch was stirred at 40° C. for 3 hours and then cooled to room temperature. 70 ml of dichloromethane were added and a phase separation was carried out. The organic phase was washed with 50 ml of 20% strength ammonium chloride solution, dried over sodium sulfate and freed of its solvent under reduced pressure.

Yield: 71.6% of theory; very pale pink-colored oil; purity 95% (GC)

$^1$H NMR (δ ppm, CDCl$_3$): 8.0 (1H, broad, NH), 3.4 (2H, t, CH$_2$), 2.6 (2H, t, CH$_2$), 2.3 (1H, m, SH), 2.1 (2H, t, CH$_2$), 1.5 (2H, quin., CH$_2$), 1.25 (2H, qua., CH$_2$), 0.8 (3H, t, CH$_3$)

Example 2

Synthesis of N-(2-mercaptoethyl)-2-ethylhexanamide

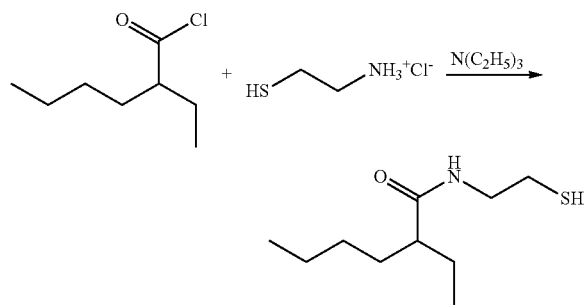

22.7 g of 2-mercaptoethylamine hydrochloride (0.2 mol) and 32.4 g of triethylamine (0.32 mol) were introduced in suspension in 130 ml of dichloromethane at 0° C.-5° C. Over the course of 25 minutes, 16.8 g of 2-ethylhexanoyl chloride (0.1 mol) were added dropwise. The batch was stirred at 0° C. to 5° C. for 1 hour, at 40° C. for 1.5 hours, and then at room temperature for 12 hours. 70 ml of saturated ammonium chloride solution were added and a phase separation was carried out. This was repeated twice and the organic phases were combined, dried over sodium sulfate, and freed of their solvent under reduced pressure. The residue obtained was purified by column chromatography (97 toluene:3 methanol).

Yield: 56.5% of theory; colorless oil; purity 85% (H NMR)

$^1$H NMR (δ ppm, CDCl$_3$): 6.2 (1H, broad, NH), 3.4 (2H, t, CH$_2$), 2.7 (2H, t, CH$_2$), 1.9 (1H, m, CH), 1.6 (2H, m, CH$_2$), 1.5 (2H, m, CH$_2$), 1.4 (1H, t, SH), 1.3 (2H, m, CH$_2$), 0.9 (6H, t, 2×CH$_3$).

Example 3

Synthesis of N-(2-mercaptoethyl)-2,2-dimethylpropionamide

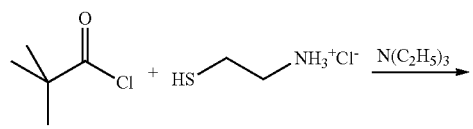

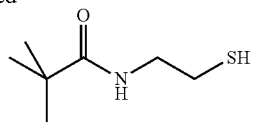

22.7 g of 2-mercaptoethylamine hydrochloride (0.2 mol) and 32.4 g of triethylamine (0.32 mol) were introduced in suspension in 130 ml of dichloromethane at 0° C.-5° C. Over the course of 30 minutes, 12.1 g of pivaloyl chloride (0.1 mol) were added dropwise. The batch was stirred at 0° C. to 5° C. for 1 hour, at 40° C. for 1.5 hours, and then at room temperature for 12 hours. 70 ml of saturated ammonium chloride solution were added and a phase separation was carried out. This was repeated twice and the organic phases were combined, dried over sodium sulfate, and freed of their solvent under reduced pressure.

Yield: 81.8% of theory; white powder; purity 90% (H NMR)

$^1$H NMR (δ ppm, CDCl$_3$): 6.1 (1H, broad, NH), 3.4 (2H, t, CH$_2$), 2.6 (2H, t, CH$_2$), 1.3 (1H, t, SH), 1.2 (9H, s, tBu)

Guideline Formulation for Corrosion Control Primers

Performance testing for atmospheric corrosion control is carried out using a corrosion control formulation based on a commercial aqueous styrene-acrylate dispersion for paints (Acronal® Optive 410, BASF Corp.). The dispersion used has the following properties:

| | |
|---|---|
| Solids content | 49-51% |
| pH | 7.5-8.5 |
| Brookfield viscosity | 500-1000 cps |
| Density | 1.06 g/cm$^3$ |
| Minimum film forming temperature (MFFT (to ASTM D 2354)) | about 12° C. |
| Particle size | about 110 nm |

The test formula was prepared in accordance with the following general instructions:

393.4 g of the styrene-acrylate dispersion were admixed with 2.2 g of a commercial defoamer for coating materials (mixture of polysiloxanes and hydrophobic solids in polyglycol; BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia, and 58.6 g of water was added by means of a Dispermate. Incorporated additionally, with stirring, was a mixture of 7.2 g of phenoxypropanol (film-forming assistant) and 7.2 g of benzine 180-210° C. (film-forming assistant).

Added subsequently were 85.0 g of a hematite pigment (Bayferrox® 130 M, Lanxess), 82.1 g of an anticorrosion pigment based on zinc molybdenum phosphate (Heucophos® ZMP, basic zinc molybdenum orthophosphate hydrate, Heubach), 36.0 g of magnesium silicate (filler; talc 20 M 2, Luzenac), and 127.8 g of a filler based on barium sulfate and zinc sulfide (30% by weight ZnS) (Litopone® L). The mixture as a whole was dispersed with glass beads (ø3 mm) for at least 30 minutes.

Thereafter, with further stirring, a further 166.4 g of styrene-acrylate dispersion, 1.9 g of BYK® 022, and 3.7 g of a 1:1 mixture of water and a commercial corrosion inhibitor (corrosion inhibitor L1, Erbslöh) were added, and the glass beads were removed by sieving.

To finish, the batch was admixed with a mixture of 3.7 g of a 25% strength solution of a commercial, urethane-based thickener (Collacral® PU 85, BASF AG) and 13.2 g of butyl glycol (solvent) and also, if appropriate, the pH was adjusted to about 9.5 using concentrated ammonia. This gives 1000 g of a corrosion control primer with a solids content of 61% and a pigment/volume concentration (PVC) of 23%.

The completed coating material was admixed with 2.5 g of a 33% strength solution of N-(2-mercaptoethyl)pentanamide in butyl glycol (Use example 1).

For comparison purposes, a further sample of the coating material was left without addition of a mercaptoethylamide (Use example 2 (comparative)).

Application of the Formulations Through Steel Panels, Preparation for the Salt Spray Test The primers under test were diluted with fully demineralized water to the desired viscosity (300 to 1000 mPas (ICI Rotothinner sphere)) and drawn down using a box-type doctor blade onto a cleaned, nongalvanized steel panel (200×80× 0.9 mm); the slot size of the doctor blade was selected so as to give a dry coat thickness of 60-85 μm.

After six days of drying at room temperature and one day of thermal conditioning at 50° C., the reverse of the metal test panel was coated with a solvent-based coating material, for protection from corrosion, and the edges were taped off with Tesa®-film.

To end with, the metal test panel was inscribed down to the substrate, using a scorer, on the side coated with the primer under test.

Salt Spray Test/Evaluation

Using the test panels, a salt spray test was conducted in accordance with DIN EN ISO 7253 (test duration: 240 h). The metal panels are pictured in FIG. 1 (Use Example 2 (comparative) on the left; Use Example 1 (inventive) on the right-hand side).

It is clearly apparent that the metal panel of Use Example 1 is much less corroded than that of Use Example 2 (comparative).

The invention claimed is:

1. A method of applying corrosion control coats to metallic surfaces, which comprises treating the metallic surface with a formulation with comprises at least one binder, at least one pigment, at least one filler, and at least one compound (D), wherein the compound (D) is selected from the group consisting of N-(2-mercaptoethyl)pentanamide, N-(2-mercaptoethyl)butanamide, N-(2-mercaptoethyl)hexanamide, N-(2-mercaptoethyl)-2-ethylhexanamide, N-(2-mercaptoethyl)-2, 2-dimethylpropionamide, N-(2-mercaptoethyl)benzamide and N-(2-mercaptoethyl)-2-phenylacetamide.

2. The method according to claim 1, wherein further to the compound (D) there is a disulfide (D1) having the following formula

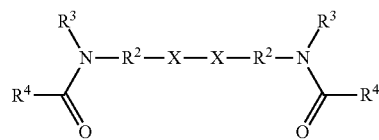

wherein $R^3$ and $R^4$ are selected independently of one another from the group consisting of $C_1$-$C_{18}$ alkyl, $C_6$-$C_{12}$ aryl, $C_5$-$C_{12}$ cycloalkyl, and five- to six-membered heterocycle which comprises oxygen, nitrogen, sulfur, or mixtures thereof, and may each optionally be substituted by aryl, alkyl, aryloxy, alkyloxy, a heteroatom, a heterocycle or a mixture thereof, $R^3$ may additionally be hydrogen, and $R^2$ is a divalent organic radical, the fraction of the disulfide (D1) not exceeding 30% by weight, based on the compound (D).

3. The method according to claim 1, wherein further to the compound (D) is a compound (D2) having the following formula:

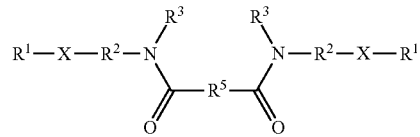

wherein $R^5$ is a divalent organic radical, $R^1$ and $R^3$ are selected independently of one another from the group consisting of hydrogen, $C_1$-$C_{18}$ alkyl, $C_6$-$C_{12}$ aryl, $C_5$-$C_{12}$ cycloalkyl, and five- to six-membered heterocycle which comprises oxygen, nitrogen, sulfur, or mixtures thereof, and may each optionally be substituted by aryl, alkyl, aryloxy, alkyloxy, a heteroatom, a heterocycle or a mixture thereof, $R_2$ is a divalent organic radical and X is selected from the group consisting of —S—, —SO— and —SO$_2$—.

4. The method according to claim 1, wherein the metallic surface is a steel surface.

5. The method according to claim 4, wherein the steel surface is an untreated steel surface, a galvanized steel surface or an aluminized steel surface.

6. The method according to claim 1, wherein the metallic surface is in the course of service is in contact with atmospheric air.

* * * * *